Dec. 29, 1959     T. R. BLACK     2,919,101

HYDRAULIC VALVE

Filed Nov. 30, 1956

INVENTOR.
THOMAS R. BLACK
BY
Townsend and Townsend
ATTORNEYS

United States Patent Office 2,919,101
Patented Dec. 29, 1959

2,919,101

HYDRAULIC VALVE

Thomas R. Black, Port Isabel, Tex.

Application November 30, 1956, Serial No. 625,377

3 Claims. (Cl. 251—25)

This invention relates to a novel hydraulic valve.

In certain plumbing installations it is desirable to provide actuating valves of the push button type. Such valves are generally arranged to actuate hydraulic lines such as a water line by the manual depression of an actuating plunger. The valves also are generally arranged to turn off or de-actuate hydraulic lines either with or without a time delay upon manually releasing the actuating plunger. In many valves of the push button type the amount of force required to actuate the actuating plunger is great enough to cause an inconvenience or hardship to the persons using the equipment or there is required a series of offset springs and the like to overcome the hydraulic force in opening the valve and to thereafter maintain the valve in opened condition.

A principal object of this invention is to provide a push button type valve with a manually actuated plunger arranged to actuate a sensitive low pressure valve. The low pressure valve then opens a water flow channel to operate a hydraulic actuated high pressure valve so that the only manual force required to actuate the high pressure valve is the force required to actuate the sensitive hydraulic actuating valve actuating mechanism.

A further object of this invention is to provide a valve in which hydraulic pressure functions to both open a valve upon actuation of a control plunger and operates to bias the plunger toward its normal position so the valve automatically closes upon release of the plunger without the need of returning the plunger by other means.

One advantage of this invention is that there is required but three relatively moving parts, to wit: an actuating plunger, a reciprocating piston, and a captive ball valve arranged so that the entire valve is hydraulically actuated both in opening and closing by the positioning of the actuating plunger thereby completely eliminating the need of springs or other mechanical devices to either open or close the valve.

Another feature and advantage of this invention is that the manual force necessary to actuate the valve is extremely small as compared with the hydraulic pressure flow controlled thereby.

Still another feature and advantage of this invention is that the valve requires a minimum of relatively moving parts thus enabling simplicity of operation, maintenance, construction and relative economy in construction.

Other objects of the present invention will become apparent upon reading the following specification and referring to the accompanying drawings in which similar characters of reference represent corresponding parts in each of the several views.

Figure 1:
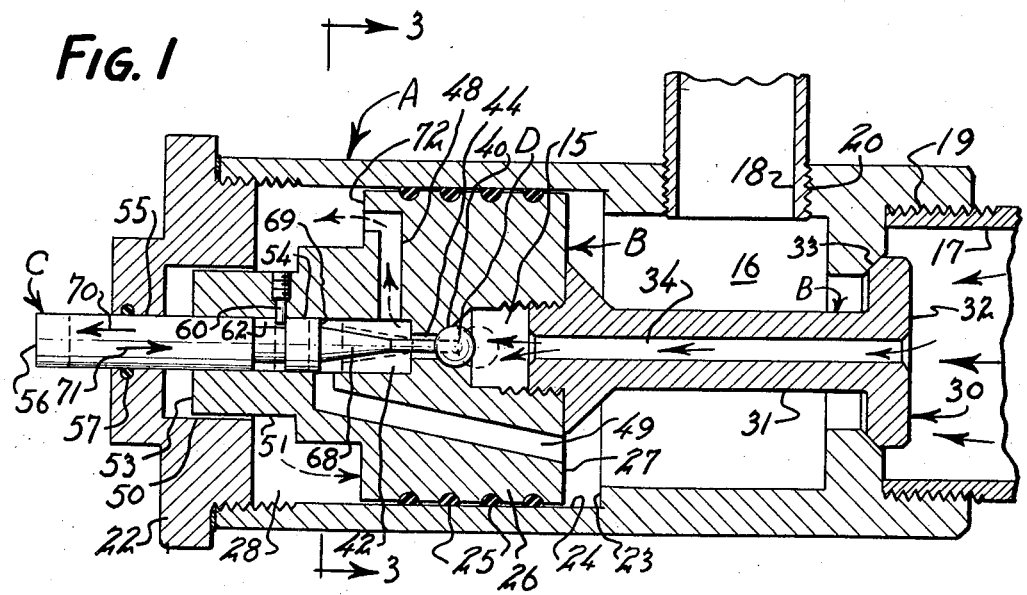
Fig. 1 is a sectional view of the valve with the actuating member shown in a first condition of operation by dotted lines.
Figure 2:
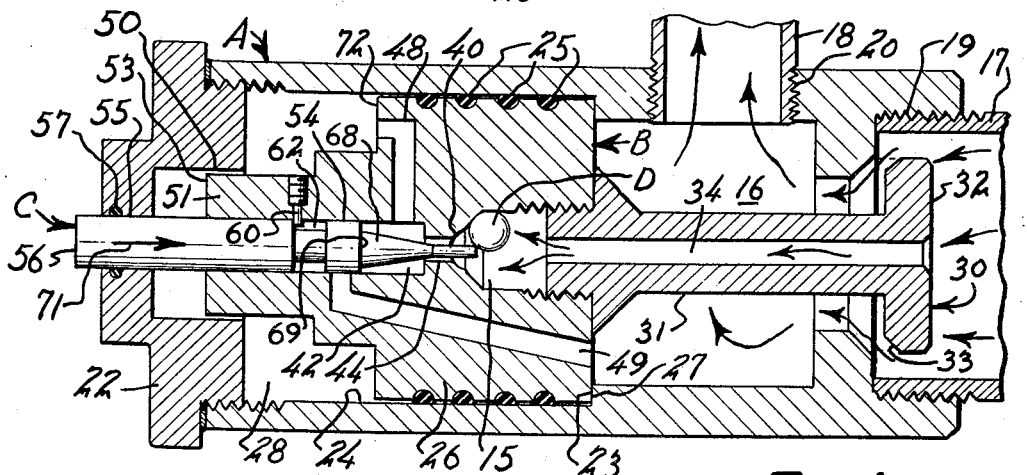
Fig. 2 is a similar view of Fig. 1 with the valve shown in a different phase of operation.
Figure 3:
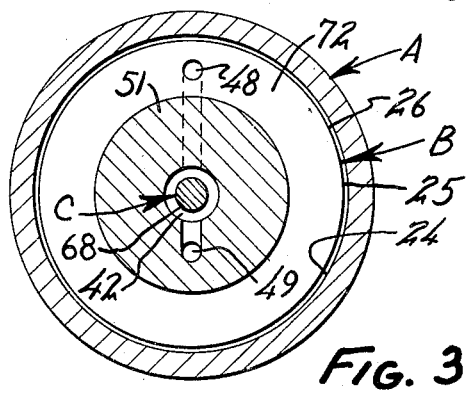
Fig. 3 is a cross-section of Fig. 1 taken at line 3—3.

The valve arrangement of this invention generally comprises a valve housing or casing A, a reciprocating piston actuated poppet valve member B within the housing and a plunger actuating member C arranged to unseat a captive ball check valve D in a valve chamber 15 within member B.

The housing or casing A comprises a manifold 16 which forms fluid communication between an inlet pipe 17 and an outlet pipe 18. The casing A has a threaded inlet port 19 into which a water or other hydraulic line or pipe 17 may be attached and a threaded outlet port or aperture 20 into which an outlet line or pipe 18 may be attached. Casing A is formed with a cylinder 24 between cap 22 mounted on the rear end of casing A, and an annular flange 23 located to the rear of the outlet port 20, and manifold 16.

The member B is provided with a piston 26 mounted to reciprocally slide within cylinder 24. O-rings 25 are provided around the cylinder to completely seal the piston 26 and the cylinder 24 against fluid communication between a pressure chamber 28 formed between head or cap 22 and the piston and the manifold 16 formed on the opposite side of the piston.

A poppet type valve 30 is mounted on front face 27 of piston 26. The stem 31 of the valve is attached to the center of the front face 27 and the head 32 of the valve 30 engages an annular valve seat 33 formed at the mouth of inlet port 19. When the piston moves forwardly the head 32 is moved away from the valve seat 33 and when piston 26 is moved rearwardly valve head 32 of valve 30 is seated in seat 33 to close the inlet 19. Stem 31 is formed with an axial fluid passage 34 which opens from the face of the head 32 of the valve to form a fluid passageway to the chamber 15 within piston 26. The passage 34 provides fluid communication between inlet pipe 17 and the captive ball chamber 15 regardless of the condition of valve 30 by effectively bypassing the valve.

Chamber 15 opens to a chamber 42 formed in piston 26 by a passageway 44 with valve seat 40 disposed at the mouth of passageway 44. Check valve ball D is arranged to be seated against captive ball valve seat 40 to prevent fluid escape from the chamber 15 unless the ball is displaced by plunger mechanism C as will hereinafter be explained.

A passageway 48 opens the chamber 42 to pressure chamber 28 and a passageway 49 opens the chamber 42 to the manifold 16.

The cap 22 is formed with a guide cylinder 50 having a diameter substantially reduced with respect to the diameter of cylinder 24 into which is slidably guided a cylindrical rear guide projection 51 on the rear 53 of piston 26. Cylinder 50 guides the piston 26 and forms a stop to provide a space in pressure chamber 28 even when the piston is in the full rear position.

One end portion 54 of plunger C is mounted inside chamber 42 of piston 26 and the opposite end 56 projects outwardly through an aperture 55 in cap 22. The opposite end portion 56 of the plunger forms a means to manually actuate the plunger C and is provided with O-rings 57 to stop all fluid communication through aperture 55. A stop pin 60 is mounted in piston 26 to project into manifold chamber 42 against plunger C in an area 62 of reduced diameter. The pin limits forward and rearward movement of plunger C within predetermined limits. The wall of end portion 54 of plunger C is arranged to cover and seal passageway 49 when the plunger C is pushed forwardly and to open the passageway when the plunger is at its normal or rearward position. A ball D unseating pin 68 projects forwardly from the front face 69 of end portion 56. Pin 68 passes through passageway 44 to force captive ball D out of seat 40 when the actuating plunger C is in the forward position.

In operation with inlet pipe 17 supplied with fluid under pressure and plunger C in the normal rearward position as indicated by arrow 70, captive ball D is seated against seat 40 and water pressure against valve 30 forces the valve 30 against valve seat 33 thus closing all fluid communication between pipe 17 and pipe 18. Upon depression of actuating plunger C in the forward position as indicated by arrow 71, passageway 49 is covered by the portion 54 of the plunger and sealed closed and pin 68 unseats ball D from valve seat 40. Water thus flows from chamber 15 through passageway 44 into chamber 42 and thence through passageway 48 into pressure chamber 28. The face of valve 30 is smaller in cross-sectional area than the rear face 72 of the piston 26 so the water in chamber 28 forces piston 26 forwardly until piston head 32 abuts against flange members 23. The forward movement of the piston 26 also moves the valve 30 so it is displaced from seat 33 and a fluid communication path is opened through manifold 16 from pipe 17 to pipe 18. Once in the opened position the pressure against rear face 72 of the piston is greater or at equilibrium with the force exerted by pressure against the piston front face 27 and the valve 30 so that as long as forward pressure is exerted against plunger C the valve remains in the open position.

It is appreciated that in order to sustain operation of the valve the plunger C must be manually forced to follow forwardly along with the movement of piston 26. It can be seen that a very small amount of pressure is needed to unseat ball D from seat 40 so that the greater valve actuating work occurs by water pressure moving the member B after the unseating of the captive ball D.

Water pressure in chamber 42 against face 69 biases the plunger toward its normal position so upon release of plunger C the water pressure within chamber 42 acts against face 69 of the plunger to force the plunger rearwardly. Captive ball D is then seated in seat 40 by the fluid flow in chamber 15 and fluid communication into chamber 42 from the inlet pipe 17 is stopped. At the same time passageway 49 is opened so that there is a fluid path from pressure chamber 28 into chamber 42 and thence through passageway 49 into the manifold 16. This path effectively creates an escape path for the fluid within pressure chamber 28 so that the water pressure against valve 30 forces the member B rearwardly until the valve is seated against seat 33 and fluid communication between pipes 17 and 18 is stopped.

When the plunger C is depressed the valve opens almost immediately. When the plunger C is released the valve can be arranged to close equally fast or may be constructed to close after a predetermined delay by reducing the diameter of passageway 49 so it will require a longer time for the liquid in pressure chamber 28 to escape. The impedance to flow offered by the escape path through passageways 48 and 49 and chamber 42 thus will determine the speed of response of the valve in closing. The lower the impedance, the quicker will be the closing action of the valve.

It has been found that the valve is effective in operation under comparatively low fluid pressure such as 5 pounds per square inch and the valve is equally effective in operation under extremely high pressure. In either case the amount of force necessary to actuate the valve is determined by amount of bias against plunger C which in turn is determined by the cross-sectional area of face 69 and the amount of force necessary to unseat captive ball D.

One feature of the valve arrangement is that should the water pressure fall below that necessary to actuate the valve, the valve can be actuated to open and close by manually pushing in and pulling out the plunger C. This is possible because pin 60 limits relative forward and rearward movement between the plunger C and the valve member B so that manual force exerted on the plunger can be positively transmitted to the valve member B after the plunger C is moved to the aforesaid forward or rearward limits.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A fluid flow control device to establish and block fluid communication between a first pipe and a second pipe comprising: a casing forming an interior closed cylinder having a fluid inlet port to connect with a first pipe and a fluid outlet port to connect with a second pipe; a piston reciprocally mounted within said cylinder defining a pressure chamber between a first end of the cylinder and the piston, and defining an inlet and outlet connecting manifold between the piston and the second end of the cylinder; said piston arranged to move between a first position adjacent the first end of said cylinder and a second position a fixed distance from the second end of said cylinder; a valve connected to the piston, said valve arranged to reciprocate with said piston and close the inlet port when said piston is in said first position, and to open said port when in the second position; said piston formed with a first and second chamber connected by a first passageway; said piston formed with a second fluid passageway bypassing said valve to form a fluid communication path from said inlet port to said first chamber; a captive ball check valve mounted in said first chamber and disposed to seat in the mouth of said first passageway to prevent fluid from passing from said first chamber to said second chamber; said piston formed with a third passageway to provide fluid communication between said pressure chamber and said second chamber; said piston formed with a fourth passageway to provide fluid communication between said second chamber and said inlet and outlet connecting manifold; an actuating plunger having a first end portion slidably mounted in said second chamber and having the opposite end portion projecting exteriorly from the first end of said cylinder; said plunger being movable to a first position wherein said check valve is closed and fluid communication between said second chamber and said fourth passageway is effected, and into a second position wherein said check valve is displaced open and fluid communication between said second chamber and said fourth passageway is closed off, said plunger having a tip projecting forwardly from the first end portion to displace and open the captive ball check valve upon said plunger being moved to said second position, and the wall of said plunger formed to close fluid communication between the second chamber and said fourth passageway while said plunger is in said second position, said plunger being movable to said first position solely by the fluid pressure at said inlet port.

2. A fluid flow control device according to claim 1 and wherein stop means are provided in said piston to engage an area of reduced diameter formed in said plunger to provide a stop for movement of said plunger at said first and said second positions.

3. A fluid flow control device to establish and block fluid communication between a first pipe and a second pipe comprising: a casing forming an interior closed cylinder having a fluid inlet port to connect with a first pipe and a fluid outlet port to connect with a second pipe; a piston reciprocally mounted within said cylinder defining a pressure chamber between a first end of the cylinder and the piston, and defining an inlet and outlet connecting manifold between the piston and the second end of the cylinder; said piston arranged to move between a first position adjacent the first end of said cylinder and a second position a fixed distance from the second end of said cylinder; said piston formed with an interior first and second chamber connected by a first passageway; a captive ball check valve mounted in said first chamber and disposed to seat in the mouth of said first passageway to prevent fluid from passing from said first chamber to said second chamber; a second passageway formed in said piston opening from said second chamber to said pressure chamber; a third passageway formed in said piston opening from said second chamber to said manifold; a valve connected to the piston, said valve arranged to reciprocate with said piston and close the inlet port when said piston is in said first position, and to open said port when in the second position; a fourth passageway opening from the face of said valve in fluid communication with said inlet port and passing through the stem of said valve to said first chamber; an actuating plunger having a first end portion slidably mounted in said second chamber and having an opposite second end portion projecting exteriorly from the first end of said cylinder; said plunger having a face facing the said manifold urged to move said plunger to a first position by fluid pressure in said second chamber and said plunger manually movable to a second position by depression of the second end portion of said plunger; the first end portion of said plunger having a wall portion slidably mounted against the wall of said second chamber to close fluid communication between said second chamber and third passageway when said plunger is in the second position; and check valve opening means mounted on the face of said plunger to displace said captive ball check valve and establish fluid communication between said first and second chambers when said plunger is in the second position, said plunger being movable to said first position solely by the fluid pressure at said inlet port.

References Cited in the file of this patent

UNITED STATES PATENTS

| | | |
|---|---|---|
| 495,575 | Apel | Apr. 18, 1893 |
| 624,511 | Littlefield | May 9, 1899 |
| 642,118 | Henderson | Jan. 30, 1900 |
| 876,518 | Brooks | Jan. 14, 1908 |
| 1,005,641 | Gilson | Oct. 10, 1911 |
| 2,654,562 | Foster | Oct. 6, 1953 |
| 2,675,024 | Clark | Apr. 13, 1954 |

FOREIGN PATENTS

| | | |
|---|---|---|
| 90,180 | Sweden | Sept. 7, 1937 |